(No Model.)
C. REHN.
FUNNEL.
No. 368,007. Patented Aug. 9, 1887.
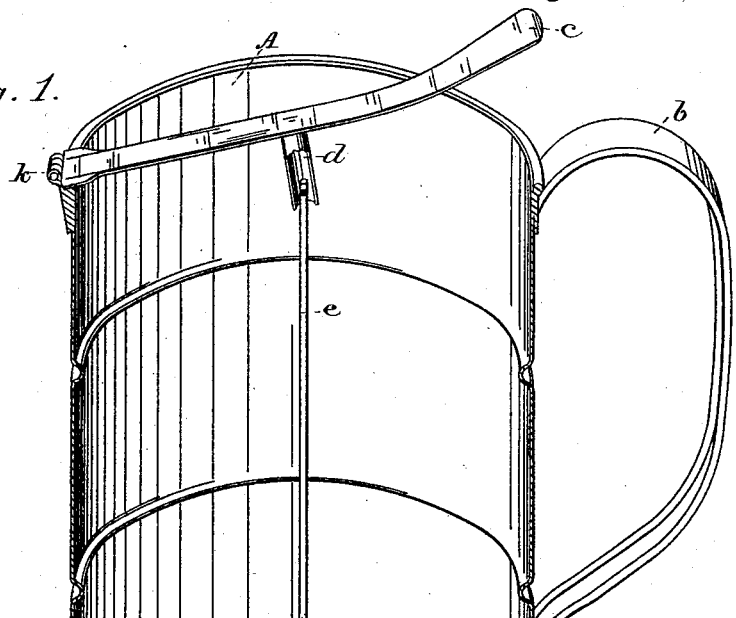
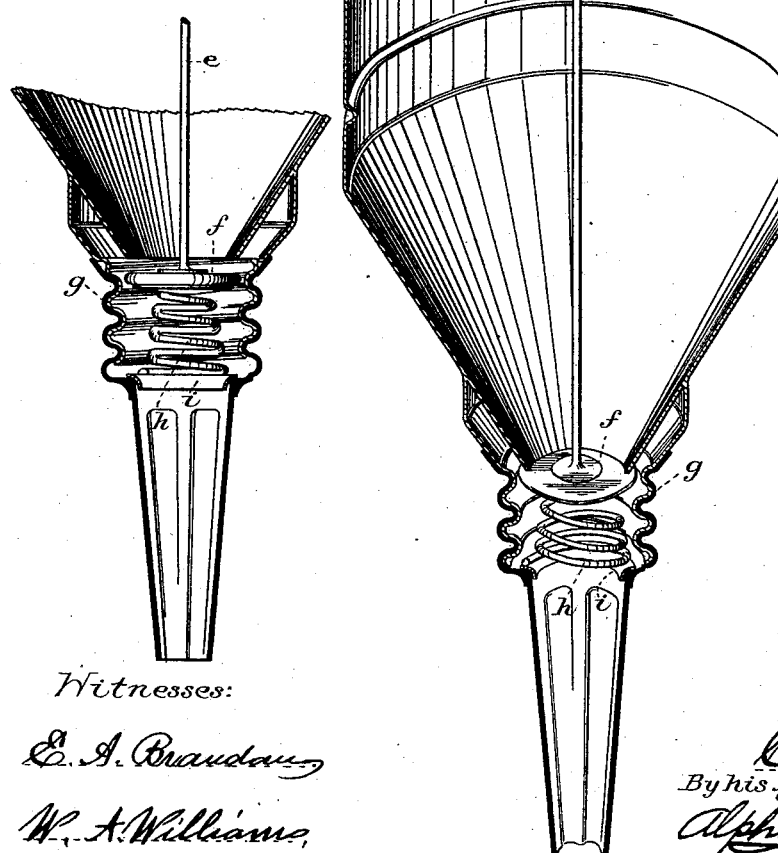
Witnesses:
E. A. Braudau
W. A. Williams
Inventor:
Charles Rehn
By his Atty.
Alphonso T. Smith

UNITED STATES PATENT OFFICE.

CHARLES REHN, OF SAN FRANCISCO, CALIFORNIA.

FUNNEL.

SPECIFICATION forming part of Letters Patent No. 368,007, dated August 9, 1887.

Application filed September 27, 1886. Serial No. 214,702. (No model.)

*To all whom it may concern:*

Be it known that I, CHARLES REHN, a resident of the city and county of San Francisco, State of California, have invented a new and useful Improved Funnel; and I hereby declare that the following is a full, clear, and exact description of the same, reference being had to the accompanying drawings.

My invention relates to a device combining a graduated measure and funnel for measuring and discharging fluids without waste.

The following description fully explains the nature of my said invention and the manner in which I proceed to construct, apply, and use the same, the accompanying drawings being referred to by figures and letters.

Figure 1 is a vertical section showing the valve closed and the manner of attaching the adjustable pipe. Fig. 2 is a vertical section of the lower part of the device, showing the valve open and the attachment of the spiral spring.

Referring to Fig. 1, I illustrate a funnel-measure, A, consisting of a quart-measure graduated to half-pints, the lower part of the measure being in the form of a funnel having an adjustable pipe. The device is adapted to measure milk or other fluids, and to discharge the same into receiving-vessels, and may be of any size from a pint to a gallon and suitably graduated. A handle, $b$, is attached to one side of the measure, and to the rim thereof, on the opposing side, I attach by a hinge, $k$, a lever, $c$, to which is secured centrally a socket, $d$, in which the end of the valve-rod $e$ enters loosely.

For the purpose of attaching an adjustable pipe to the funnel the lower part thereof is formed with threads, on which is screwed a threaded pipe, $g$. A valve, $f$, is attached to the rod $e$, the top of which enters socket $d$ of the lever, and the valve extends into the pipe $g$ and impinges on a spiral spring, $h$. The lower end of this spring is secured to an annular plate, $i$, which rests on a shoulder of the pipe $g$, Figs. 1 and 2.

In using my device a given quantity of a fluid is discharged from the measure through the adjustable pipe $g$ by pressing on the lever $c$, which causes the valve-rod $e$ to press down and open the valve $f$, whereby the fluid flows into and out of the pipe, Fig. 1. The discharge is stopped by removing pressure from the lever, which permits the spiral spring $h$ to close the valve, as shown in Fig. 2. In discharging a fluid—as, for example, milk—there is no waste, as the valve acts instantaneously as soon as pressure is removed from the lever, and it may be closed at the instant the required quantity of fluid has been discharged. The adjustable pipe $g$ may be unscrewed from the funnel-measure and all the parts thoroughly cleansed, after which they may be readily replaced and adjusted.

I am aware that it is not broadly new to combine with a funnel having a threaded lower end a detachable pipe.

I am also aware that it is not new to combine with a funnel a spring-actuated valve, a rod connected therewith, and a hinged lever connecting with said rod, and hence I do not seek to claim such construction; but,

Having thus fully described my invention, what I claim as new, and desire to secure by Letters Patent, is—

The combination, with a funnel having the threaded lower end, of the threaded pipe $g$, removably secured to said lower end, said pipe $g$ having an interior shoulder, an annular plate, $i$, secured to said shoulder at its lower end, a spiral spring, $h$, resting at its lower end on the plate $i$, a valve, $f$, against which said spring bears, a rod, $e$, connected with the valve and extending to the upper end of the funnel, a lever hinged to the upper rim of the funnel, and a socket, $d$, secured to the lever and connected with the valve-rod, substantially as set forth.

CHARLES REHN. [L. S.]

Witnesses:
ALPHONSO B. SMITH,
D. STOLTZ.